UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

TITANIC-OXID PRODUCT AND METHOD OF OBTAINING THE SAME.

1,223,356.      Specification of Letters Patent.     Patented Apr. 24, 1917.

No Drawing.     Application filed July 27, 1915. Serial No. 42,171.

*To all whom it may concern:*

Be it known that I, LOUIS E. BARTON, a citizen of the United States, and a resident of Niagara Falls, in the county of Niagara and State of New York, have invented a certain new and useful Titanic-Oxid Product and Method of Obtaining the Same, of which the following is a specification.

My present invention relates to the obtaining of products consisting essentially of titanic oxid, $TiO_2$, and its objects comprise provision of a novel method, resulting in a novel product, possessing novel and other physical and other characteristics especially adapting it for certain uses such, for example, as a pigment in paints.

My objectives comprise the economical production in quantities sufficient to supply industrial demand, and with comparatively little technical skill and care, of titanic oxid products possessing peculiarly distinctive properties and characteristics which render them exceptionally useful for certain purposes in the arts. My said products are, for example, not only amorphous, non-crystalline and non-granular in structure, but also exceptionally readily friable to the finest powdered condition, and of a distinctively chalky, *i. e.* feeling-like-chalk, consistency. They are also usefully distinguished from other titanic oxid products known to me in that they appear by reflected light, pure white, but, by transmitted light, under the microscope, appear as exceedingly fine, translucent particles of a characteristic straw color and this irrespective of slight variations in the quantity or nature of impurities present in the samples examined. Moreover, their absorptive capacity is very much greater than that of other titanic oxid products as attested by their requiring, desirably for certain purposes, much more oil to bring them to the usual consistency of paints, and, as is especially important and useful, they impart to "white paints" containing them the desirable bluish tinge hitherto derived only from that variety of zinc oxid known as "French zinc." Another important novel property of my products is that of remaining in suspension in the oil therewith mixed much longer than is the case with many of the heavier pigments and even some other forms of titanic oxid. Their, thus referred to, distinctive, and other, characteristics are so notable that I designate my said products "special titanic oxid" and by which title they are known.

My method of obtaining my said novel product is practised as follows, viz:

I employ as one of my materials titanium tetrachlorid ($TiCl_4$) obtained in any convenient manner, *i. e.* whether as the article now marketed under that designation or otherwise especially prepared, or, preferably the article as produced, in exceptional purity, by the method and means invented by me and for which Letters Patent No. 1,179,394 were granted on April 18, 1916.

One part, by volume, of such, or any other, titanium tetrachlorid I introduce by means of any suitable feeding device into a stoneware, or other acid-proof, retort, or still, containing one, to two, like volumes of water ($H_2O$).

Double decomposition takes place with formation of titanic acid and hydrochloric acid according to the equation:—

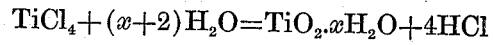

$$TiCl_4 + (x+2)H_2O = TiO_2.xH_2O + 4HCl$$

A part of the titanic acid which seems to precipitate at first while the tetrachlorid and water are gradually mixing redissolves unless the proportion of water be, as is undesirable, unduly great.

To my said solution I add sulfuric acid ($H_2SO_4$) in proportions as hereinafter described.

I then heat my solution sufficiently to distil off the resulting hydrochloric acid, which can, of course, by means of a condenser and receiver, or in any other convenient manner, be collected for future use.

I continue the distillation until slight fumes of sulfuric anhydrid are given off, the temperature meanwhile rising to 150° C., or thereabout, by which time most of the hydrochloric acid will be recovered.

The residue appears as a white mass, easily broken into lumps or grains, which will, if the operation has been conducted with ordinary care, contain say 77% to 80% of titanic oxid, 18 to 20% sulfuric anhydrid, and 2% to 3% chlorin.

I then transfer it to a calcining furnace whereby substantially all of the remaining hydrochloric acid, and resulting sulfuric anhydrid, can, by usual calcination, be expelled, and recovered, in aid of economy, if desired.

My final residue of calcination will be substantially pure titanic oxid containing, it may be, very minute quantities of whatever fixed impurities, if any, were in the materials used, and sometimes, also some chlorin and sulfur compounds. The impurities, to which I refer as fixed, are such as silica, iron oxid, etc., which though sometimes found in the final product are in quantity so small as to be negligible or unprohibitive, my said final product containing usually, say, as follows, viz:

| | |
|---|---|
| Pure titanic oxid | 97 % to 99 % |
| Iron oxid | 1 % to 1.5% |
| Silica | .1% to 1. % |
| Chlorin | Trace to .5% |
| Sulfuric anhydrid | Trace to 1. % |

I have, however, by resort to exceptionally pure materials, and the most thorough calcination possible, been able to exceptionally produce some specimens of my final product which, on analysis, showed no sulfuric anhydrid and only traces of chlorin.

My final product is also characterized as being of specific gravity 3.50 to 3.65, and, as aforesaid, is a very friable, very readily, extremely finely powderable, mass which feels, to the touch, like chalk, and its altogether predominating content is of titanic oxid, chemically uncombined with other substances, and in the form of exceptionally minute, amorphous, non-granular, translucent particles which, in mass, appear pure white by reflected light, and individually, by transmitted light, under the microscope have a characteristic straw-yellow color.

The novelty of the structure, and other physical characteristics, of my special titanic oxid are further evidenced by its behavior and results when used as a pigment in paints.

When thus mixed, as a pigment, with a suitable carrier, such as linseed oil, it requires much more, or, say, generally speaking, two and one half times more, of the latter to bring the mixture to the usually employed consistency than do any other pigments, including other forms of titanic oxid, known to me. The economy and value of this characteristic will be appreciated by those skilled in the art.

Under otherwise similar conditions my special titanic oxid proportionally imparts to paint in which it is a pigment very much greater spreading capacity than any other form of titanic oxid known to me, for example, nearly thrice the spreading capacity imparted by white lead, and more than twice that imparted by zinc oxid.

Its hiding power is also greater than that of other pigments notwithstanding its being thus spread over such a large surface.

The structure of my special titanic oxid is such that when used as aforesaid as a pigment it imparts, to the resulting white paint, the often desired slightly bluish tints which characterize such paints of which the above referred to "French zinc" is the pigment.

As to my addition of sulfuric acid to my said bath containing solution of titanium tetrachlorid in water, to form therein the normal titanic sulfate, 2.45 parts of sulfuric acid by weight to one of titanic oxid would theoretically be required, but I have discovered that addition of a comparatively small amount of sulfuric acid is sufficient to produce my special titanic oxid product. Though less than one-third of said theoretical amount will give good results, I prefer to use about one third and the proportions of the charge which I now use as most nearly ideal for the purpose are about:

100 parts (by volume) titanium tetrachlorid.
200 parts (by volume) water.
35 parts (by volume) sulfuric acid (95%).

The unimportance of more than the above proportion of sulfuric acid in the operation of my process is evidenced by the following respective analyses of respective products resulting from use of the theoretical, and one third of the theoretical quantity under otherwise similar conditions, viz:

| | Theoretical quantity sulfuric acid (No. 942 B). | One-third theoretical sulfuric acid (No. 982). |
|---|---|---|
| Titanic oxid | 97.76 | 97.20 |
| Iron oxid | 1.46 | .52 |
| Silica | .10 | .80 |
| Sulfuric anhydrid | .44 | .70 |
| Chlorin | .09 | .43 |
| | 99.85 | 99.65 |
| Specific gravity | 3.65 | 3.51 |

A pigment test made with the above product No. 982 showed the same characteristics and gave the same results as products made with the theoretical quantity of sulfuric acid.

I am aware that, prior to my invention, it has been published that a normal titanic sulfate produced by oxidizing titanium sesqui-sulfate with nitric acid will after calcining leave a white residue of titanic acid, but my experiments and researches have disclosed that neither from this, nor any other normal amorphous titanic oxid to me known, can be expected the above noted peculiarities in physical structure and other characteristics which distinguish the special titanic oxid which is the product of my said process.

The following comparative tabulation of respective characteristics of these two oxids is on this score instructive:

|  | "Normal" amorphous titanic oxid. | "Special" amorphous titanic oxid. |
|---|---|---|
| Specific gravity | 3.75 to 3.80 | 3.50 to 3.65 |
| Texture | Soft, smooth. | Very fine, but feels like chalk. |
| Color when mixed with linseed oil and spread on black surfaces. | Pure white or creamy white. | Bluish white like "French zinc." |
| Parts of oil required to one part of titanic oxid to mix to paint of the same consistency (viscosity). | 2.5 | 6.0 |

Having now described my invention, what I claim as new and desire to secure by Letters Patent is the following, viz:

1. The method of obtaining a product consisting essentially of titanic oxid ($TiO_2$) which comprises dissolving titanium tetrachlorid ($TiCl_4$) in a bath comprising water and sulfuric acid ($H_2SO_4$), distilling hydrochloric acid, and calcining the residue.

2. The method of obtaining a product consisting essentially of titanic oxid ($TiO_2$) which comprises commingling about 100 parts by volume of titanium tetrachlorid ($TiCl_4$), about 200 parts by volume of water ($H_2O$) and about 35 parts by volume of sulfuric acid, distilling hydrochloric acid from the resulting bath, and calcining the residue.

3. As a new article, a calcined, very friable, highly absorptive, substance of specific gravity 3.50 to 3.65, feeling to the touch like chalk, and also distinguished as containing at least traces of chlorin, as when admixed with oil to usual consistency of paint imparting to the surface on which it is spread a bluish white coloration, and as consisting essentially of minute particles of titanic oxid, which appear, by reflected light, white, and, by transmitted light, yellowish.

LOUIS E. BARTON.

Witnesses:
G. A. McCallum,
C. J. Kinzie.